Patented Nov. 15, 1938

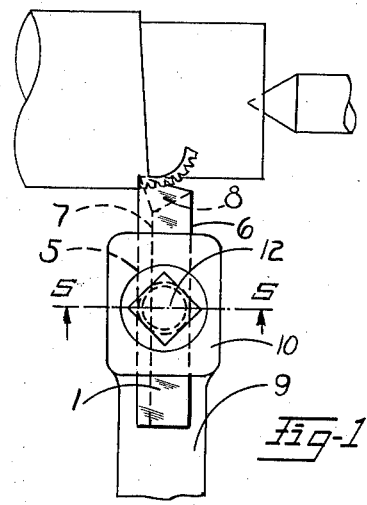
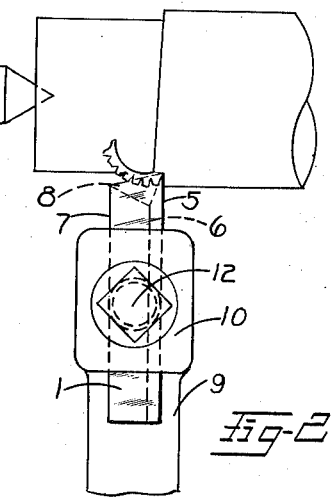
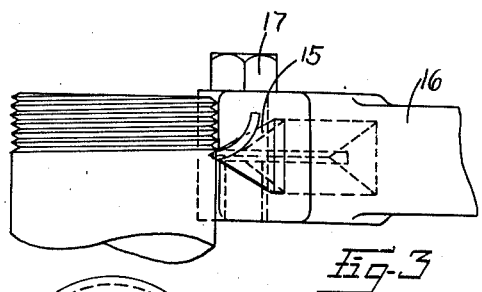
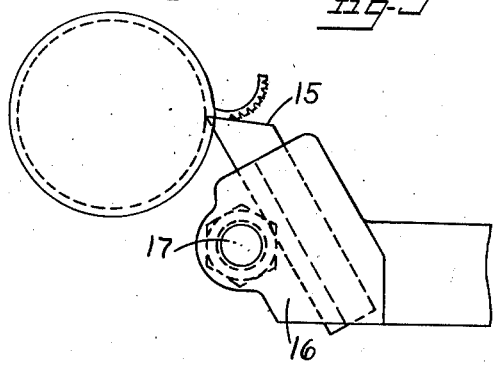
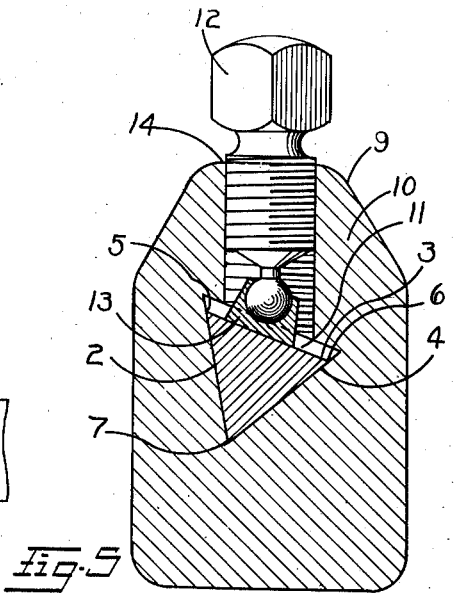

2,136,592

UNITED STATES PATENT OFFICE 2,136,592

TOOL HOLDER

John Mayer, Cleveland, Ohio

Application October 3, 1936, Serial No. 103,937

3 Claims. (Cl. 29—96)

This invention relates to cutters or tool bits for use in metal turning tools, such for instance as latches, used in facing, turning or forming shafts; as a standard threading tool and for many other purposes.

Heretofore tool bits of this type have been made from rectangular steel stock. It has been customary for the workman to form a cutting edge by grinding two faces of this stock adjacent one end of the tool, to the desired angle and then bevel this end to provide proper clearance from the work at that point. The other or rear end of the bit thus formed, is inserted in a conventional tool holder. As the tool bit is gradually consumed these grinding operations must be repeated from time to time, with much loss of worker's time and frequent interruptions to the job upon which the worker is engaged.

The principal purpose of the present invention is to overcome the foregoing objections by providing a tool bit of the type described, having a plurality of cutting edges extending throughout substantially the entire length of the stock whereby the necessity of periodically grinding side faces to form a cutting edge is obviated.

Another object of the invention is to provide a tool bit having a plurality of parallel cutting edges which can be utilized progressively by merely altering the position of the bit in its holder.

A further object of the invention is to provide a tool bit stock which can be continuously used by the worker until it is practically consumed by merely removing it from the holder from time to time for the purpose of touching up the end face of the tool, and without the necessity of grinding the side faces thereof.

Other objects and advantages of the invention will be apparent as the description is read in connection with the accompanying drawing, in which:

Figure 1 is a plan view of a tool bit mounted in its holder in proper position for making a right hand spiral cut;

Figure 2 shows the position assumed by the tool in making a left hand cut;

Figure 3 is a plan view of the improved tool bit suitably positioned in a holder for thread cutting operations;

Figure 4 is a side elevation of the tool and holder shown in Figure 3; and

Figure 5 is a sectional view taken on the line 5—5 of Figure 1.

Referring more particularly to the drawing it will be seen that the tool bit or cutter is formed of an elongated bar 1 of triangular shape throughout its entire length. In the course of manufacture the three angularly disposed side faces 2, 3 and 4 are ground to produce the sharp cutting edges 5, 6 and 7 respectively. The beveling of the front end face 8 is done by the workman, and of course the nature of the beveling is governed by the kind of work for which the tool is to be used, as will be understood by workers in the art. Briefly stated where the bit is to be used as a threading tool clearance is obtained by inclining the front end face rearwardly and to one side, left or right, according to whether the tool is moved to the left in making a right hand thread or to the right in making a left hand thread. In general lathe work the clearance is had at the sides, that is there must be clearance at one side so the tool will dig into the work and at the other side there must be clearance for the chips.

The bit is supported in a suitable holder 9 pivotally mounted on the metal working machine, not shown. This holder 9 comprises a body portion 10 having a triangularly shaped opening or socket 11 into which the correspondingly shaped bit is snugly and slidably inserted. A set screw 12, to which is swiveled a locking shoe 13, is threadedly mounted in an opening 14 in the body 10, communicating at its inner end with the socket opening 11. When the set screw is screwed home the flat lower face of the shoe 13 engages a side face of the bit and frictionally locks the latter in the holder. The bit is thus so held that the angles of the various faces of the cutting end thereof as well as the angles of the side faces remain fixed in relation to the work, as customary with tools of this kind.

The three walls of the socket opening 14 are so inclined with respect to each other that the bit will always have the desired side clearance. Consequently, as the bit is used up, it is merely necessary for the workman to remove the bit from its holder and reinsert the bit in a new position to present a new cutting edge, the working end or face of the bit of course being suitably beveled before being replaced in the holder. If desired the inner end of the bit can be of cylindrical shape to rotatably as well as slidably seat in a correspondingly shaped socket opening provided in the holder, so that the bit can be rotated to a fresh cutting position without removal from the holder. However, the holder illustrated is preferable because the walls of the triangular socket 11 cooperate with the triangularly shaped bit to positively and accurately fix both the degree of clearance and the angle at which the cutting edge engages the work.

The slightly modified form of tool disclosed in Figures 3 and 4 is the same as the tool of Figures 1, 2 and 5 with the exception that the front end face of the bit 15 is ground for thread cutting and the holder 16 is of special construction. Thus the set screw 17 for locking the bit 15 in place is horizontally disposed in the holder 16, whereas the set screw is vertically disposed with respect to the holder 9 and the work. In this form of holder the shoe 13 is not used.

From the foregoing it will be seen that much waste of time and effort is obviated by the use of my improved tool bit. The only operation necessary on the part of a workman to renew a worn cutting edge, is to remove the bit, give the latter a one third turn and replace it in the holder, of course first renewing the bevel on the working end face to conform to the work to be performed by the tool. This operation is repeated until the bit is practically used up. It is rarely necessary for the workman to touch up the side faces 2, 3 and 4 of the bit, and in no case is he compelled to form cutting edges 5, 6 and 7, as these edges are automatically renewed in the manner indicated.

While specially constructed holders are required for various kinds of work, the bit receiving socket will always be of such shape as to maintain the cutting edge and the clearance faces in proper relative position to the work, and at the same time permit of ready adjustment of the bit in the holder to present a fresh cutting edge from time to time, as the bit wears away.

Having thus described my invention, what I claim as my invention is:

1. A cutting tool comprising a holder having an equilateral triangular passage therethrough parallel with the shank thereof and having one wall at approximately 12 degree angle from perpendicular and a cutting tool of an equilateral triangular form in cross section clamped in said passage and having its working end beveled from one flat face towards the oppositely arranged apex forming one cutting edge and two reserve parallel and equally spaced sharp cutting edges.

2. A cutting tool comprising a holder having an equilateral triangular passage therethrough parallel with the shank thereof and one wall at approximately 12 degree angle from the perpendicular, a cutting tool of an equilateral triangular form in cross section and a dimension less than that of the passage, and having its working end beveled from one flat face towards the oppositely arranged apex forming one cutting edge and two reserve parallel and equally spaced sharp cutting edges, and a set screw extending radially through the holder and carrying a swiveled shoe adapted to engage one flat wall of the tool arranged at an angle to the set screw.

3. A cutter for metal cutting tools comprising metal stock of triangular cross section substantially throughout its entire length and formed with one operative and two reserve parallel and equally spaced cutting edges, the outer or working end of the cutter being beveled rearwardly and to one side of the operative cutting edge, and a holder having a socket of triangular cross section extending substantially at an angle to the perpendicular adapted to snugly receive one end of said bar and to maintain the cutting edges in working position progressively upon adjustment of the stock in the socket of the holder as the cutting edges become worn, the side walls of the triangular socket being equally spaced from the longitudinal axis of the holder whereby the tool is adapted to cut a standard V-thread.

JOHN MAYER.